US006922051B2

(12) United States Patent
Gleixner

(10) Patent No.: US 6,922,051 B2
(45) Date of Patent: Jul. 26, 2005

(54) DISPLACEMENT AND/OR ANGLE SENSOR WITH A MEANDER-SHAPED MEASURING WINDING

(75) Inventor: Franz Gleixner, Röhrmoos (DE)

(73) Assignee: Horst Siedle GmbH & Co. KG, Furtwangen (DE)

( * ) Notice: Subject to any disclaimer, the term of this patent is extended or adjusted under 35 U.S.C. 154(b) by 0 days.

(21) Appl. No.: 09/890,823

(22) PCT Filed: Dec. 29, 1999

(86) PCT No.: PCT/DE99/04126

§ 371 (c)(1),
(2), (4) Date: Aug. 6, 2001

(87) PCT Pub. No.: WO00/46574

PCT Pub. Date: Aug. 10, 2000

(65) Prior Publication Data

US 2002/0030485 A1 Mar. 14, 2002

(30) Foreign Application Priority Data

Feb. 5, 1999 (DE) .......................................... 199 04 689
Feb. 12, 1999 (DE) .......................................... 199 05 847

(51) Int. Cl.[7] ............................. G01B 7/30; G01B 7/14; G01D 5/20

(52) U.S. Cl. ............................. 324/207.17; 324/207.24; 324/207.25; 336/119

(58) Field of Search ....................... 324/207.17, 207.22, 324/207.24, 207.25; 33/706, 708; 336/119

(56) References Cited

U.S. PATENT DOCUMENTS 3,906,436 A   9/1975  Kurauchi et al.
4,005,396 A * 1/1977  Fujiwara et al. ........ 324/207.17
4,504,832 A   3/1985  Conte
5,055,814 A   10/1991 Morimura et al.
5,973,494 A   10/1999 Masreliez et al.

FOREIGN PATENT DOCUMENTS

| DE | 1 638 199 | 5/1972 |
| DE | 25 11 683 | 9/1976 |
| DE | 28 17 544 | 11/1978 |
| DE | 39 13 861 | 11/1989 |
| DE | 197 19 905 | 11/1997 |
| FR | 2 682 760 | 4/1993 |
| GB | 1 502 697 | 3/1978 |
| WO | WO 95/31696 | 11/1995 |

OTHER PUBLICATIONS

Article entitled "Einrichtung zur Lagebestimmung" dated Dec. 15, 1973 No. XP–002137356 (no translation).

* cited by examiner

*Primary Examiner*—Walter E. Snow
(74) *Attorney, Agent, or Firm*—Ostrolenk, Faber, Gerb & Soffen, LLP

(57) ABSTRACT

An inductive sensor for determining a position of a body moveable on a fixed housing includes an inductive transmission element in the body, the transmission element being operative for generating an alternating magnetic field flux. The body is movably arranged such that the flux passes over a flux path area of the housing. At least one conductor loop is arranged on the housing along a measuring length on the housing which measuring length can extend in a linear course or a circular course. At least one conductor loop is arranged on the housing extending along the measuring length, the conductor loop including a feed line and a return line. The return line has a path which at regular intervals of said measurement length alternates into and out of said flux path area. A permeation of the return line at a given measurement path location by the flux of the flux region induces a loop output voltage indicative of a body measurement length position on the housing or of a body angular position on the body.

12 Claims, 3 Drawing Sheets

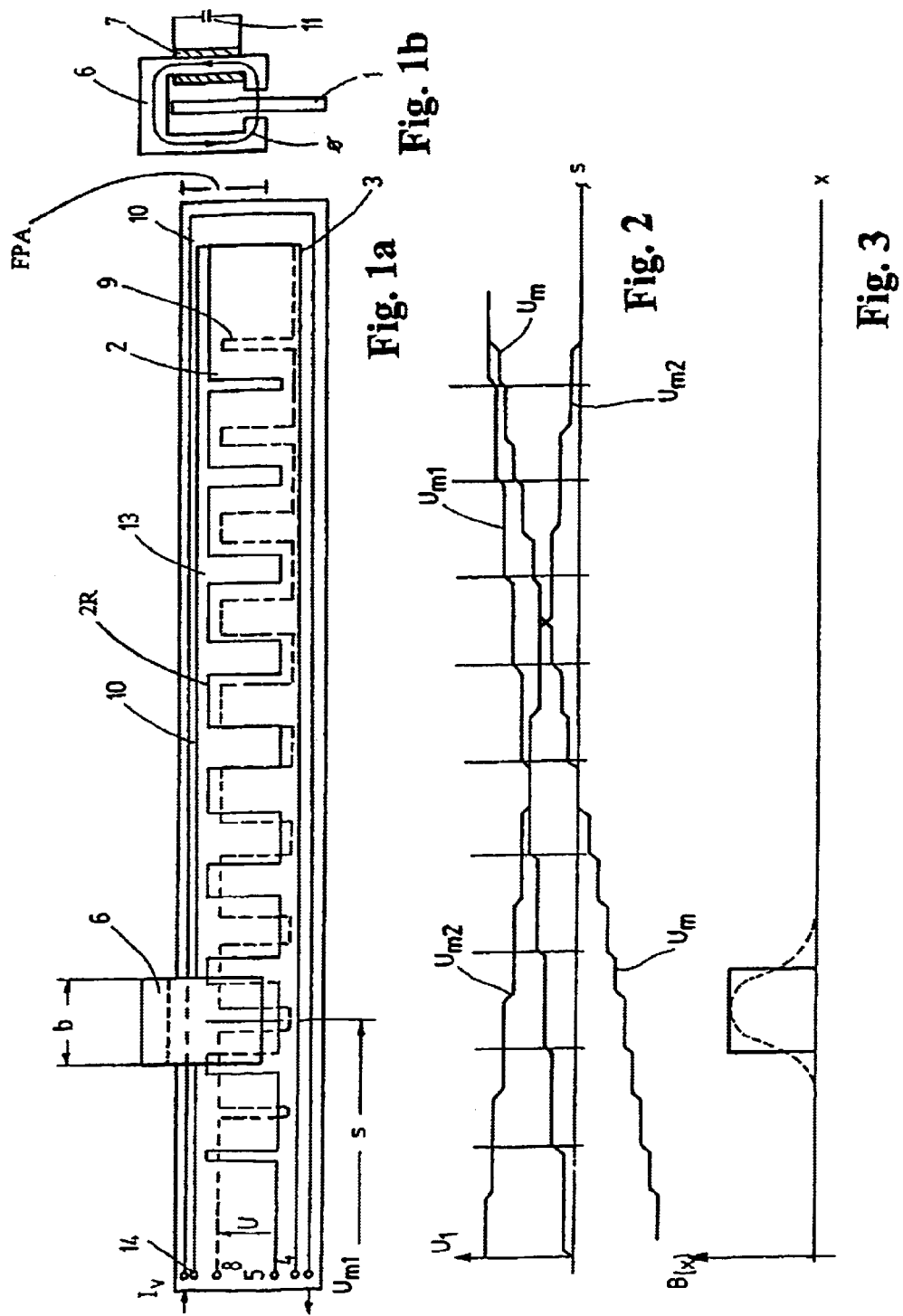

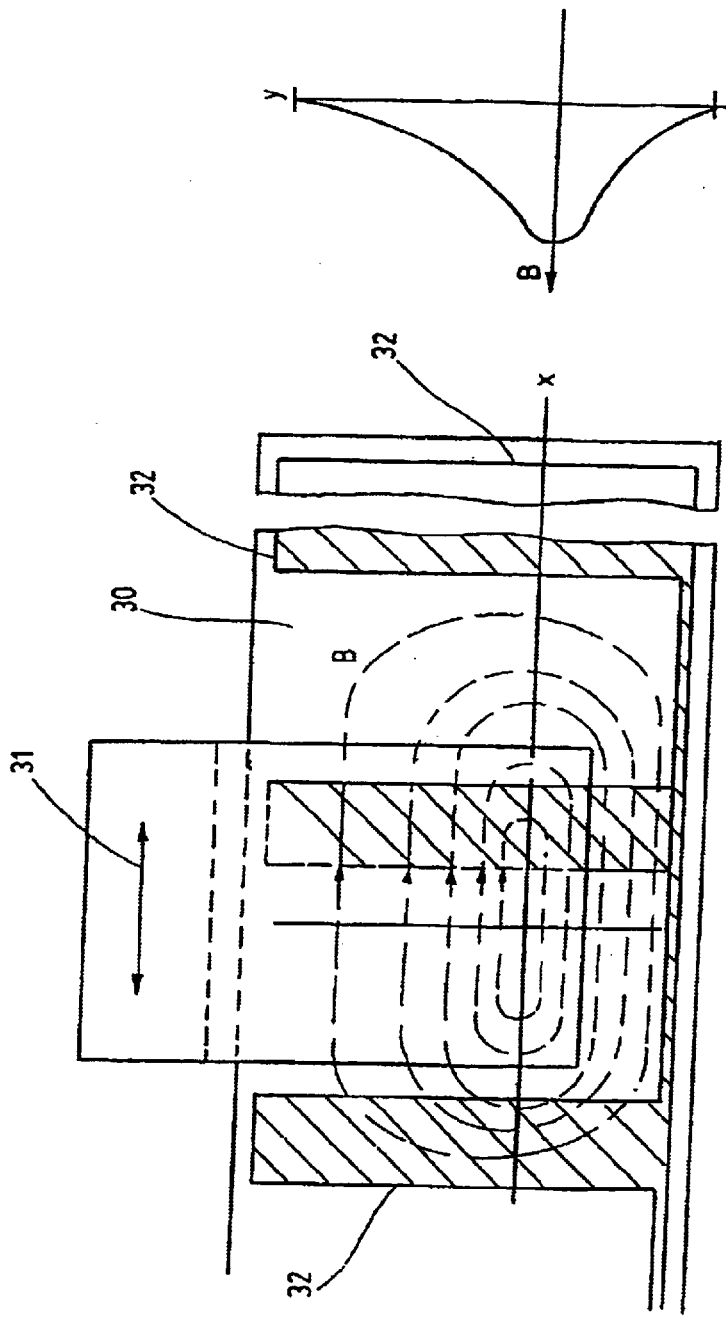
Fig. 5a
Fig. 5b
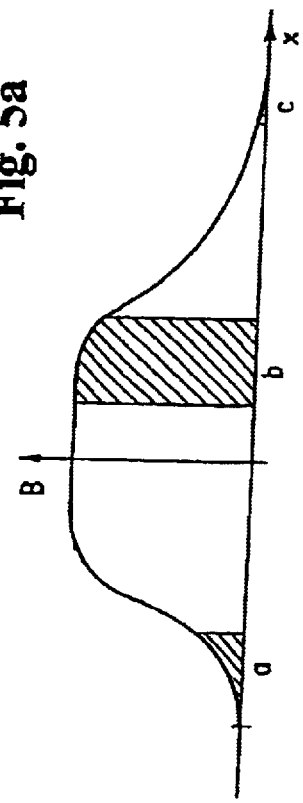
Fig. 5c

DISPLACEMENT AND/OR ANGLE SENSOR WITH A MEANDER-SHAPED MEASURING WINDING

PRIORITY CLAIM

This is a U.S. national stage of application No. PCT/DE99/04126, filed on Dec. 29, 1999. Priority is claimed on that application and on the following application:

Country: Germany, Application No.: 199 04 689.1, Filed: Feb. 05, 1999.

BACKGROUND OF THE INVENTION

The invention pertains to a displacement sensor with a meander-shaped measuring winding.

A process for measuring displacements and/or angles is described in patent application PCT/DE98/03,753. This process uses a measuring loop, in which a movable measuring head induces a voltage, which is divided by circuit devices in such a way that a displacement-dependent alternating voltage can be tapped at a measuring output. The division is preferably accomplished with the use of resistance networks or a distributed resistance. The characteristic curve of an arrangement such as this extends in only one direction over the measuring distance. In many applications, however, it is desirable to simulate nonlinear characteristics with a reversal of direction, e.g., a sine curve, over the displacement or angle.

SUMMARY OF THE INVENTION

The present invention pertains to a displacement or angle sensor, in which there is no need to divide the value; on the contrary, the induction loop is designed in such a way that the voltage induced in it depends on the position of the measuring head and can be tapped at the end of the measuring loop.

So that an induced, displacement-dependent voltage can be tapped from an induction loop, the integral over the alternating field passing through it must also be displacement-dependent. This is accomplished by having the measuring head generate a constant alternating field and by designing the measuring loop so that the component of the measuring head-generated flux permeating the loop is proportional to the anticipated position-dependent signal.

In the displacement gauge disclosed in DT 2,511,681 A1, this is achieved by providing turns, the number of which increases with the distance from the zero point, on a surface permeated by the flux; in addition, the individual turns run at an angle into the surface. The use of a measuring loop with several turns suffers from the disadvantage that, when a relatively large number of turns is required, the winding becomes very wide, especially when the design includes a printed circuit, as is preferably done for reasons of economy and production efficiency. So that a continuous increase in the measuring voltage with increasing position is achieved, another turn must be provided at a distance as close as possible in value to the width of the measuring core. The measuring core must extend around one side of the coil in such a way that the flux passes through all the turns. Especially in cases of long measurement lengths, this can lead to a situation in which the measuring head and the measuring loop are relatively large, which has unfavorable effects both on costs and on the range of possible applications. Although it is possible to allow the turns which pass through the area of the air gap to extend at a slant, this leads to the disadvantage that the measurement result is strongly influenced by lateral displacements of the measuring head. In addition, it is difficult to adapt the pitch of the turn to the insufficiently linear course of the inducing magnetic field.

Another disadvantage of long measurement lengths is based on the distributed capacitance and inductance of the measuring winding, which, as a result, has a relatively low resonant frequency. Operation in the range of the resonant frequency or above would cause difficult-to-correct measurement errors.

These disadvantages can be eliminated by providing the measuring loop with only one or with relatively few turns, which have the form of a meander. The meander has the same pitch over the entire measurement distance, but the width of the individual segments changes with the position in the measurement direction. The segments of the meander which project into the area of the measuring core are permeated by the magnetic field, whereas the other parts remain outside the magnetic field. When the ratio of the width of the meander segments which project into the core area to the pitch of the meander is proportional to the desired characteristic curve, the characteristic curve thus obtained approximates the desired characteristic curve. The advantage of this design is that it is possible to provide almost any desired number of turn segments crosswise to the measuring direction without causing an extreme increase in the width of the measuring coil or high inductance and high distributed capacitance of the measuring winding. This means that a narrow, short measuring core can be used. If a sufficient number of turns is present, it is possible to arrange the winding perpendicular to the measuring direction. As a result, the dependence on the course of the magnetic field crosswise to the measuring direction is considerably reduced.

BRIEF DESCRIPTION OF THE DRAWINGS

Additional advantages and features of the invention can be derived from the following description and from the drawings in which:

FIG. 1a shows a schematic diagram of an embodiment of a sensor according to the invention;

FIG. 1b is an end view of FIG. 1a;

FIG. 2 shows a schematic diagram of the voltage which can be tapped from the sensor illustrated in FIG. 1a and of the magnetic induction;

FIG. 3 shows a schematic diagram of the induction occurring in the sensor shown in FIG. 1a;

FIG. 4b is a section view taken on the line A–B in FIG. 4a;

FIG. 5a shows a schematic diagram of an exemplary embodiment of a sensor; and

FIGS. 5b and 5c shown the induction course in directions x and y, respectively.

DESCRIPTION OF THE PRESENTLY PREFERRED EMBODIMENTS

Figure 4A:
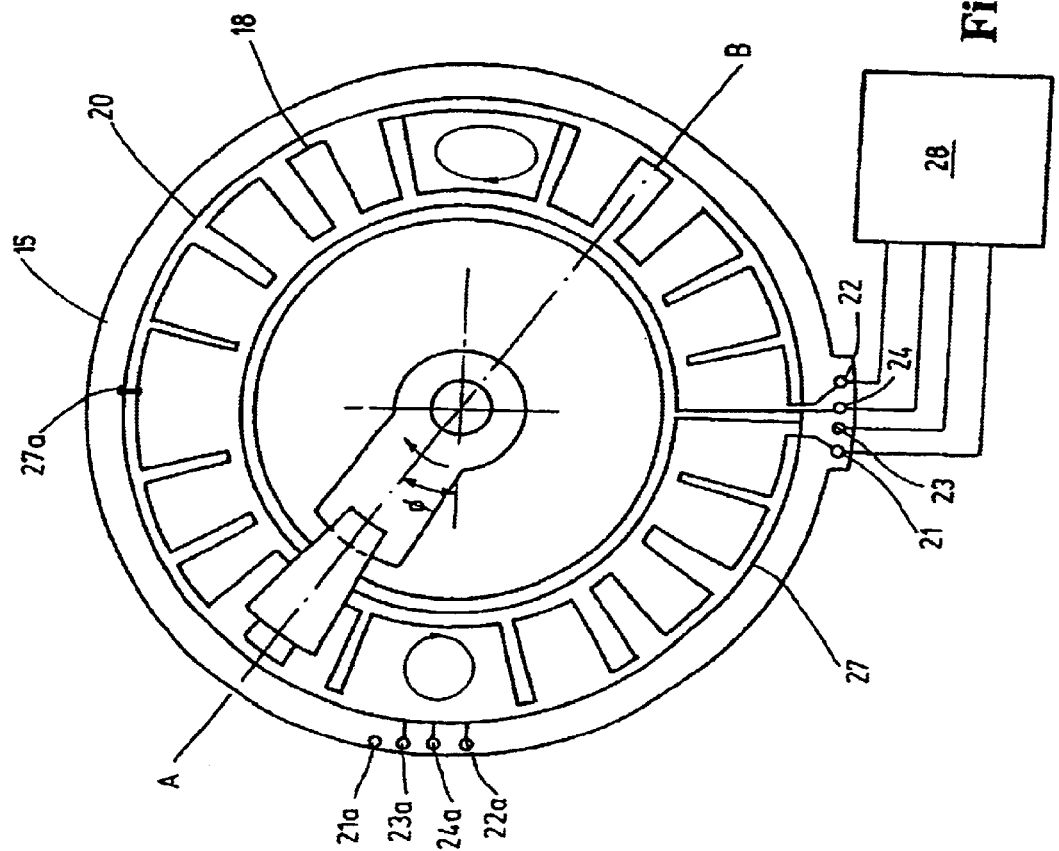
FIG. 4a shows a different embodiment of an inductive sensor making use of the invention.

FIG. 5a shows an arrangement consisting of a core 31 with an air gap, in which a printed-circuit board 30 is present. A coil, through which current passes, generates an alternating field in the core, which permeates the printed-circuit board 30. The broken lines represent lines of equal induction. The diagrams (FIGS. 5b and 5c) next to and below these lines show the course of the induction in the direction of motion of the measuring head (x direction) and crosswise to that (the y direction). The physical circumstances make it impossible to arrive at a perfectly linear course. In contrast, it is possible to achieve a curve with good symmetry in the x direction but not in the y direction. To avoid sensitivity to lateral displacements (y direction), the induction loop is designed so that it consists of conducting tracks 32 which extend in the direction of motion of the measuring core and also perpendicular to the direction of motion; they thus form rectangles, which project deeply into the air gap of the measuring core and thus absorb practically all of the magnetic flux in this area.

FIGS. 1a and 1b show a design of this type. On the printed-circuit board 1 is a meander-shaped conducting track 2, one end of which is connected to an electrical connecting terminal 4 by the conducting track 3, whereas the other end is connected to connecting terminal 5. The measuring core 6 has a winding 7, through which an alternating current flows. The production of this alternating current is not described in detail here. It can be derived from, for example, DE 197-57,689.3-52 and from PCT/DE98/03,753, to which reference is made here.

Via the measuring core 6, the current $I_v$ in the primary loop 10 induces a voltage in the winding 7, which, along with a capacitor 11, forms a resonant circuit. The excitation current, however, can also be generated elsewhere, e.g., by direct feed. The limbs of the core encompass the printed-circuit board 1, so that the magnetic flux of the measuring core permeates the measuring loop where it projects into the core area (shown on the right). The pitch of this meander corresponds to the magnetically effective width of the measuring core 6 or a whole-number fraction thereof. Between the connecting terminals 4 and 5, a voltage $U_{m1}$ is thus obtained as a function of the position of the measuring core, as shown in FIG. 2. For the sake of simplification, it is assumed that the field extends only over the width of the measuring core and remains uniform there over the entire width. The voltage $U_{m1}$, which starts at 0 at the beginning of the measurement distance, increases in a linear manner by an amount of 1/n as the first, narrow segment of the meander extends into the core; the voltage then remains constant until the next segment is reached. At the end of the distance, the measuring loop occupies the entire field of the measuring core and thus provides full voltage.

In practice, the transition between the individual segments is not quite the same as illustrated in FIG. 2, in which the magnetic flux is assumed to proceed as illustrated in FIG. 3; instead, the field changes as illustrated in FIG. 5. Because of unavoidable stray fields, the magnetic flux will also emerge laterally into the edge areas. This leads to the course shown in broken line in FIG. 3. The solid line represents the idealized course, the broken line the actual course. As a result, the characteristic curve shown in FIG. 2 becomes "blurred", which leads to an approximation to a continuous course or, in the example above, to a linear course. In addition, a sufficiently close approximation of the characteristic to the desired course can also be achieved by designing the air gap and/or the cross section of the core in the air gap in an appropriate manner.

A further improvement is obtained by the use of a second measuring loop, e.g., on the rear surface of the printed-circuit board 1. When this forms a meander which is offset by half the pitch and the output signal is formed from both measuring loops, the number of transitions is doubled.

In FIG. 1, a conducting track 9 of this type is shown in broken line. It is connected at one end to the common connecting terminal 4 via the conducting track 3; at the other end, it is connected to a test connector 8. In correspondence with the flux permeating the conductor loops 3, 9, the voltage $U_{m2}$ is induced, as shown in FIG. 2. From the difference between the two voltages $U_{m1}$ and $U_{m2}$, the voltage $U_m$ is formed, which has twice the number of transitions and twice the output voltage. The error associated with the transitions is thus cut in half. The same result is obtained when the two measuring loops are connected in series. In this case, the pitches of the two measuring loops must be the same.

Further improvement in the course of the curve can be obtained by designing the meander with a narrower pitch, in which case the effective width of the core is a whole-number multiple of the pitch of the meander.

In practice, errors occur as a result of temperature effects and lateral displacements of the measuring core. These errors can be avoided almost completely by using the ratio between a reference voltage, which represents all of the flux permeating the measuring core, and the measuring voltage at the measuring loop instead of the absolute value of the measurement voltage. Here it is a logical next step to provide another measuring loop, which is formed in FIG. 1 from a feed line 3 and a conducting track 13, which leads to a connecting terminal 14. While the measuring head is also contributing to the induction in the measuring loop, all of its flux permeates this additional loop regardless of the position of the head. The voltage available at the connecting terminal of this loop serves as a reference value for the total voltage induced by the measuring core.

In this measurement process, the techniques described in DE 197-57,689.3-52 and PCT/DE98/03,753 can be used concomitantly, to the entire content of which reference is made here and which are included in the present application:
  measuring core with a resonant coil;
  adaptation to oscillator impedance with transformer;
  use of the oscillator as the frequency-determining component of an oscillator circuit;
  ratio measurement with a reference winding;
  compensation for voltage not induced as a function of displacement.

The method of the meander-shaped induction loop can, of course, also be combined with a distributed resistance so that, for example, the sensor can be checked to see that it is functioning properly or so that additional control data can be obtained. It is possible to generate, for example, a curve of reference input values versus the displacement measured with the resistance element, an additional end-point signal, or the like. It is advantageous here that it is also possible to provide pitches in different directions over the entire distance, which is difficult to achieve with a distributed resistance.

Neither the measuring distance nor the measuring process using a resistance element is limited to straight stretches. The arrangement can also be easily used for curves. These are preferably arcs of a circle, such those which occur when angles are measured.

Because the area ratio of the meander can be varied over the distance in any way desired, it is possible to generate any desired function over the measuring distance, as long as the pitch does not exceed a value predetermined by the width of the core. The maximum possible pitch is thus $U_{max}/b$, where $U_{max}$ is the maximum obtainable measurement voltage and b is the width of the measuring core.

This is advantageous especially in applications where angles are measured over 360° C. without any limitation on the angle. In this case, it is necessary to represent two functions in order to arrive at a clear correlation over the complete angular range. Known designs such as resolvers use an output signal in the form of a sine curve and additional signal in the form of a cosine curve. From the ratio of the two output voltages to each other, it is possible to calculate the angles uniquely anywhere in the rotational range. This process is not limited to a sine function.

Figure 4B:
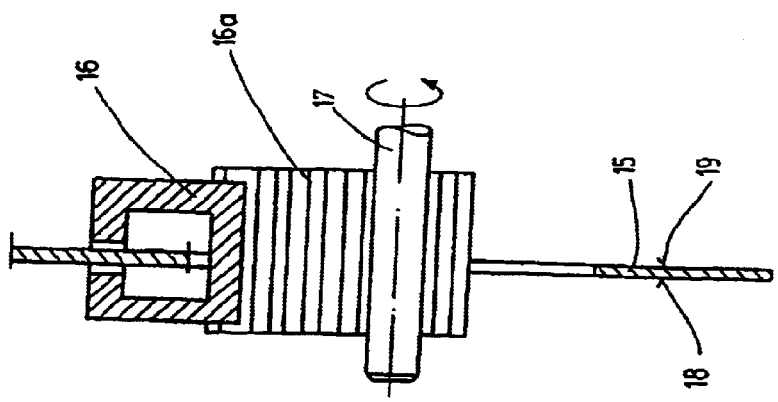

FIGS. 4a and 4b show a schematic diagram of an angle sensor for measuring angles over a range of 360° and a section view through the sensor. On a rotatably supported shaft 17, a measuring core 16 is mounted by a holder 16a in such a way that a stationary, ring-shaped printed-circuit board 15, which is concentric to the shaft, lies in the air gap of the measuring core 16. When the shaft rotates, the measuring core 16 passes over the conducting tracks 18, 19. The two conducting tracks 18, 19 are applied to opposite sides of the printed-circuit board 15. Both have the same geometry but are offset 90° from each other. The conducting track 18 is shown on the top. It is divided into two halves, and in the middle it is connected by a conducting track 27, which forms a circle around the conducting track 18 and extends to the connecting terminal 23, to the electrical reference point of the evaluation circuit 28. On the side opposite the connecting terminals 21, 22, 23, 24, the conducting tracks 18 and 27 are connected electrically to each other by a contact point 27a. The measurement signal is tapped at the two other connecting terminals 21, 22 and also sent to the evaluation circuit. The conducting track 18 is designed in such a way that each of the two conducting tracks 27, 18 forms a loop. Some, all, or none of the magnetic flux of the measuring core permeates this loop as a function of the angular position. A voltage is induced accordingly. The voltage at the connecting terminals 21, 22 have a course which approximates a sine curve over 180°. The corresponding measuring loops on the rear (connecting terminals 21a, 23a, 24a, 22a) provide a sine curve offset by 90°, which corresponds to a cosine function. Appropriate evaluation in a circuit (not described in detail) then leads to a clear identification of the angle.

To obtain an exact fit to a sine curve or some other curve intended for evaluation, a suitably finer grid and/or an appropriately shaped measuring core and/or electronic linearization can be provided. For electronic linearization, a continuously rising measurement value is required, which is achieved by the use of a sufficiently fine grid and/or a suitably shaped measuring core.

As the measuring body 6 moves along the measuring length of the housing 1, it passes over a flux path area FPA as shown in FIG. 1a, this area being where the alternating magnetic field flux generated by the inductive transmission element permeates the conductor loops 2 and 9 arranged on housing. Each conductor loop 2, 9 has a feed line, e.g., feed line 3 of conductor loop 2 and a return line such as return line 2R of conductor loop 2. It is the return line of these conductor loops which at regular intervals alternate into and out of the flux path area. The locations at which the return lines are for each return line spaced one from another at a uniform pitch. Conductor loop 2 can be arranged at one side of the housing, and the conductor loop 9 arranged on an opposite housing side. Also the conductor loop layout 9 can be offset relative to that of conductor loop 2 by, e.g., a half pitch as is the arrangement depicted in FIG. 1a. It will be understood that the FIGS. 4a, 4b sensor includes a flux path area on housing 15 which will be defined by respective inner and outer concentric circular boundaries corresponding with the reach of the measuring core air gap.

What is claimed is:

1. An inductive sensor, comprising:
a fixed housing;
a body moveable on said fixed housing, said body having an inductive transmission element operative for generating an alternating magnetic field flux during movement of said body said flux passing over a flux path area of said fixed housing; and
at least one conductor loop arranged on the fixed housing so as to extend along a measurement length of said housing, said conductor loop including a feed line extending along the measurement length and a return line, said return line having a path which at regular intervals of said measurement length alternates into and out of said flux path area, a permeation of said return line at a given path location by the flux of said flux region inducing a loop output voltage indicative of a measurement length position of said body on said fixed housing, the return line having a width in areas permeated by large amounts of flux that is proportional to an expected output value associated with a desired position value, thereby producing an analog output signal.

2. An inductive sensor according to claim 1, further comprising a reference loop, said reference loop having a loop return line disposed in said flux path area so that said reference loop return line is continuously permeated by all of said flux inducing a reference loop output voltage for use as a reference for a total voltage induced with said inductive transmission element.

3. An inductive sensor, comprising:
a fixed housing;
a body moveable on said fixed housing, said body having an inductive transmission element operative for generating an alternating magnetic field flux during movement of said body said flux passing over a flux path area of said fixed housing;
at least one conductor loop arranged on the fixed housing so as to extend along a measurement length of said housing, said conductor loop including a feed line extending along the measurement length and a return line, said return line having a path which at regular intervals of said measurement length alternates into and out of said flux path area, a permeation of said return line at a given path location by the flux of said flux region inducing a loop output voltage indicative of a measurement length position of said body on said fixed housing; and
another conductor loop arranged on said fixed housing, said other conductor loop including a second feed line and a second return line, said second return line having a path which at regular intervals of said measurement length which are offset from the intervals of said one conductor loop alternates into and out of said flux path area, said other loop inducing a loop output voltage additive to the output voltage of said one conductor loop for indicating a measurement length position of said body on said fixed housing.

4. An inductive sensor, comprising:
a fixed housing;
a body moveable on said fixed housing, said body having an inductive transmission element operative for generating an alternating magnetic field flux during movement of said body said flux passing over a flux path area of said fixed housing;
at least one conductor loop arranged on the fixed housing so as to extend along a measurement length of said housing, said conductor loop including a feed line extending along the measurement length and a return line, said return line having a path which at regular intervals of said measurement length alternates into and out of said flux path area, a permeation of said return line at a given path location by the flux of said flux region inducing a loop output voltage indicative of a measurement length position of said body on said fixed housing; and another conductor loop arranged on said fixed housing, said other conductor loop including a second feed line and a second return line, said second return line being arranged at a fixed housing side opposite a housing side at which said one conductor loop return line is arranged, said second return line at regular intervals of said measurement length which are offset from the intervals of said one conductor loop alternating into and out of said flux path area, said other loop inducing another loop output voltage, a difference between said other loop output voltage and the voltage induced in said one conductor loop indicating a measurement length position of said body on the housing.

5. An inductive sensor according to claim 1, wherein plural independent measuring loops are provided for obtaining body position indicative measurement values.

6. An inductive sensor, comprising:
a fixed housing;
a body moveable on said fixed housing, said body having an inductive transmission element operative for generating an alternating magnetic field flux during movement of said body said flux passing over a flux path area of said fixed housing; and
at least one conductor loop arranged on the fixed housing so as to extend along a measurement length of said housing, said conductor loop including a feed line extending along the measurement length and a return line, said return line having a path which at regular intervals of said measurement length alternates into and out of said flux path area, a permeation of said return line at a given path location by the flux of said flux region inducing a loop output voltage indicative of a measurement length position of said body on said fixed housing, said return line path alternating into and out of said flux path area at locations spaced one from another at a uniform pitch along said measurement length, said inductive transmission element having a measuring core of high permeability material, said core having an air gap, a width of the air gap in a direction of said measurement length corresponding to said pitch.

7. An inductive sensor according to claim 6, wherein an effective length of said air gap is a whole-number multiple of said pitch.

8. An inductive sensor according to claim 6, wherein an effective length of said air gap is twice said pitch.

9. An inductive sensor, comprising:
a fixed housing;
a body moveable on said fixed housing, said body having an inductive transmission element operative for generating an alternating magnetic field flux during movement of said body said flux passing over a flux path area of said fixed housing; and
at least one conductor loop arranged on the fixed housing so as to extend along a measurement length of said housing, said conductor loop including a feed line extending along the measurement length and a return line, said return line having a path which at regular intervals of said measurement length alternates into and out of said flux path area, a permeation of said return line at a given path location by the flux of said flux region inducing a loop output voltage indicative of a measurement length position of said body on said fixed housing, said return line path alternating into and out of said flux path area at locations paced one from another at a uniform pitch along said measurement length, said inductive transmission element having a measuring core of high permeability material, said core having an air gap, an average of an induction over a width of said conductor along a line perpendicular to a measurement length direction during a movement of the measuring core rising and falling in an approximately linear form over a distance equal to said pitch.

10. An inductive sensor according to claim 1, wherein said measurement length is circular, said conductor loop being arranged on said housing in a circular course, said transmission element being mounted for rotation about said conductor loop for measuring an angular position of the body on said measurement length.

11. An inductive sensor;
a fixed housing;
a body moveable on said fixed housing, said body having an inductive transmission element operative for generating an alternating magnetic field flux during movement of said body said flux passing over a flux path area of said fixed housing;
at least one conductor loop arranged on the fixed housing so as to extend along a measurement length of said housing, said conductor loop including a feed line extending along the measurement length and a return line, said return line having a path which at regular intervals of said measurement length alternates into and out of said flux path area, a permeation of said return line at a given path location by the flux of said flux region inducing a loop output voltage indicative of a measurement length position of said body on said fixed housing, said measurement length is circular, said conductor loop being arranged on said housing in a circular course, said transmission element being mounted for rotation about said conductor loop for measuring an angular position of the body on said measurement length; and
another conductor loop arranged on said fixed housing in a circular course, said one and said other conductor loops each extending over an angle of 360 degrees, said other conductor loop including a second feed line and a second return line, said second return line having a path which at regular intervals of said measurement length alternates into and out of said flux path area, said other loop inducing another loop voltage, a ratio of said one conductor loop voltage over said other loop conductor voltage being indicative of a body angular position on said fixed housing.

12. An inductive sensor according to claim 11, wherein said output voltages of said one conductor loop and said output voltage of said other conductor loop approximate out-of-phase sine functions.

* * * * *